United States Patent [19]

Hama et al.

[11] Patent Number: 4,607,662

[45] Date of Patent: Aug. 26, 1986

[54] THREE-WAY CHANGE-OVER VALVE

[75] Inventors: Tomio Hama; Kiyoyasu Yamazaki, both of Okaya, Japan

[73] Assignee: Nihon Pisuko Kabushiki Kaisha, Nagano, Japan

[21] Appl. No.: 727,915

[22] Filed: Apr. 26, 1985

Related U.S. Application Data

[63] Continuation of Ser. No. 492,046, May 6, 1983, abandoned.

[30] Foreign Application Priority Data

May 10, 1982 [JP] Japan .................................. 57-78720

[51] Int. Cl.⁴ .............................................. F16K 11/04
[52] U.S. Cl. .......................... 137/625.65; 137/625.44
[58] Field of Search ....................... 137/625.65, 625.44

[56] References Cited

U.S. PATENT DOCUMENTS

| | | | |
|---|---|---|---|
| 1,333,681 | 3/1920 | Riley | 137/625.65 |
| 2,246,802 | 6/1941 | Kehm et al. | 137/625.44 |
| 2,284,059 | 5/1942 | Kehm et al. | 137/625.44 |
| 2,665,088 | 1/1954 | Lobelle | 137/625.44 |
| 3,339,586 | 9/1967 | Tenkku et al. | 137/625.65 |
| 3,545,470 | 12/1970 | Paton | 137/625.44 |
| 3,921,670 | 11/1975 | Clippard, Jr. et al. | 137/625.65 |
| 4,285,497 | 8/1981 | Guttal | 137/625.44 |
| 4,403,765 | 9/1983 | Fisher | 251/129 |

Primary Examiner—Henry C. Yuen
Attorney, Agent, or Firm—Birch, Stewart, Kolasch & Birch

[57] ABSTRACT

An input port, an output port, and an exhaust port are opened on inside walls of a fluid chamber in a valve box. A valve body is provided which is capable of swing in the fluid chamber so as to change over the opening and closing of the input and exhaust ports. A controlling mechanism for the valve body is provided which is capable of swing toward the input port to close the input port. The valve body is capable of swing against the pressure of a fluid flowing in from the input port to close the exhaust port, allowing a pressurized fluid to flow out from the output port. For exhaust, the controlling mechanism forces the valve body to swing against the flow-in pressure of the fluid from the input port to close the input port and the pressurized fluid which has entered the output port side is discharged through the exhaust port.

1 Claim, 2 Drawing Figures

THREE-WAY CHANGE-OVER VALVE

This application is a continuation of copending application Ser. No. 492,046, filed on May 6, 1983, now abandoned.

DESCRIPTION OF THE PRIOR ART

Conventional 3-way change-over valves are divided into two types: In one type, a spool having openings for flow-path change-over is provided are inserted into a cylinder and the change-over of fluid flow-paths is effected by sliding the spool. In the other type, a spherical valve is employed which has openings for flow-path change-over provided and the change-over of fluid flow-paths is effected by rotating the spherical valve. These conventional 3-way change-over valves, which employ a sliding surface with openings for flow-path change-over, have disadvantages in that the sliding surface is often involved in contamination with foreign matter so that the resistance against the sliding operation is too high for smooth change-over, etc.

SUMMARY OF THE INVENTION

To meet such a situation with conventional 3-way change-over valves, the present invention has the following objects: first to offer a 3-way change-over valve in which a valve body, capable of opening and closing an input and an exhaust port for change-over, is provided in the space of a fluid chamber in a valve box. The resistance against the flow-path change-over is lowered so much as to allow smooth change-over operation. The system does not employ any sliding surfaces which may be troubled by contamination with foreign matter. Second, to offer a 3-way change-over valve in which an input port is provided on a wall of the valve box, an exhaust port is provided on a wall adjacent to the wall the input port, and a valve body is held with a pivot at the intersection between these two walls so as to open and close alternately the input and exhaust ports. The change-over of the valve body requires only a slight force since the valve body is designed to open the exhaust port not entirely at once but gradually from one of its end sides.

BRIEF DESCRIPTION OF THE DRAWINGS

The drawings appended illustrate suitable examples of 3-way change-over valves of the present invention.

SPECIFICATION OF THE INVENTION

Figure 1:
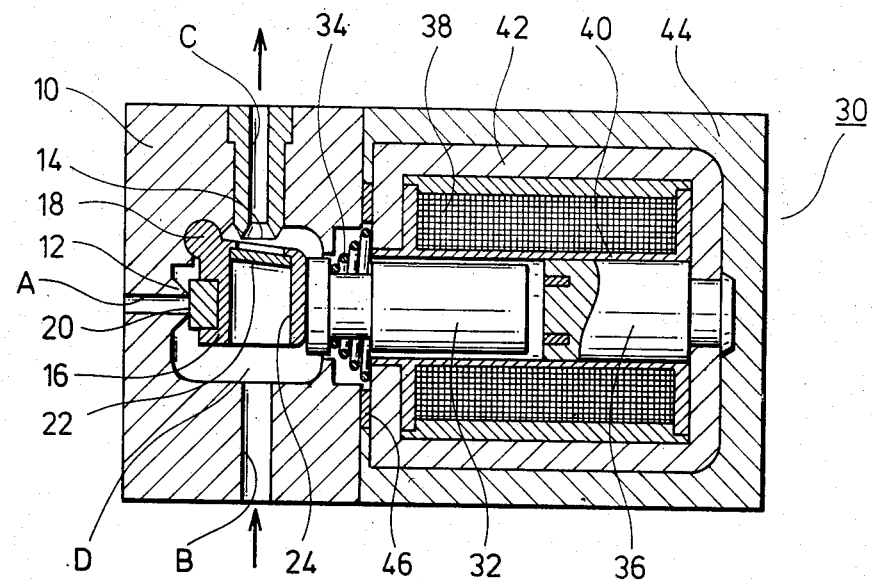
FIGS. 1 and 2 are cross-sectional views showing the flow paths for exhaust and output, respectively.

In FIG. 1, a valve box 10 is provided with an air chamber D which is formed in an approximate cube with its one side-wall opened. Air chamber D is provided with an input port A on its side-wall opposite to the open side, with an output port B on a side-wall adjacent to the port-A-provided side-wall, and with an exhaust port C on another side-wall adjacent to the port-A-provided side-wall. The openings of input port A and exhaust port C to air chamber D are provided with projected valve seats 12 and 14, respectively. A valve body 16 in an approximate cubic form is equipped on its one edge with a pivot 18, which is received on the inside-wall of air chamber D so as to enable valve body 16 to swing toward valve seats 12 and 14.

An input-controlling valve 20, made of an elastic material such as rubber, is fixed on the wall of valve body 16 facing valve seat 12 of input port A.

An exhaust controlling valve 22, also made of an elastic material such a rubber, is held in a hole 24 on valve body 16 so as to face exhaust port C.

An electromagnetic solenoid as a controlling mechanism, indicated by the component-assembly no. 30, is fixed valve 10 over the open side of air chamber D.

A movable iron core 32, with its one end designed to enter air chamber D, presses valve body 16 toward input port A by the force of a spring 34 to bring input-controlling valve 20 into contact with valve seat 12 for closing input port A.

A fixed iron core 36, a coil 40 wound on a bobbin 38, and a yoke 42 constitutes the solenoid, which, when electric current is passed through coil 38, will pull up movable iron core 32 against the force of spring 34, thus releasing valve body 16 from the pressing force of spring 34.

Figure 2:
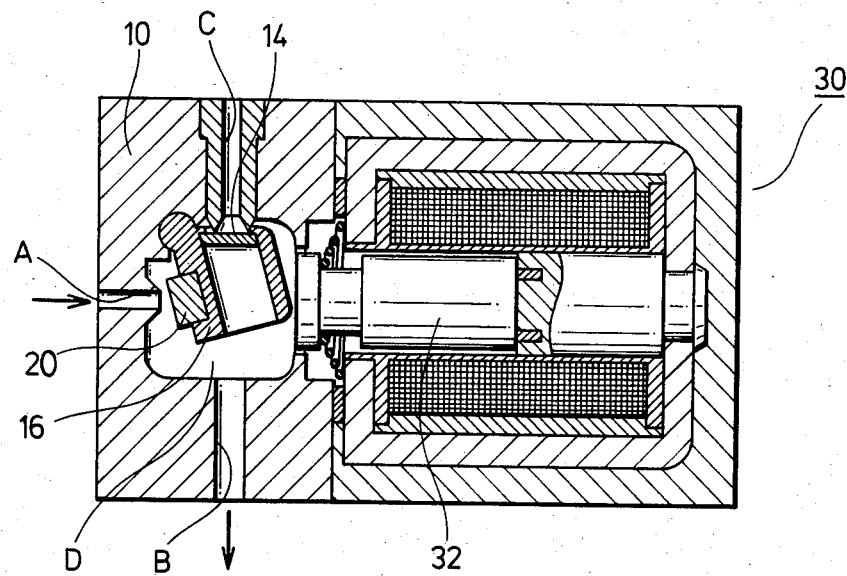

The solenoid assembly is encased in a casing 44 and equipped with a packing 46. With the above-described structure, a passage of electric current through coil 38, as described above, allows the solenoid to pull up the movable iron core 32 against the force of spring 34 to bring the valve body 16 into a free state. Hereafter, the air pressure from input port A will cause valve body 16 to swing about pivot 18 toward exhaust port C, letting air into air chamber D until the inside pressure of air chamber D is increased so as to bring the exhaust-controlling valve 22 into tight contact with valve seat 14. Thus, exhaust port C has been closed and output port B is allowing air to flow in, as illustrated in FIG. 2.

On the other hand, when coil 38 has its current turned off with deactivation of the solenoid, movable iron core 32 will be pushed out by spring 34 with valve body 16 pushed toward input port A, until inputcontrolling valve 20 has been brought into tight contact with valve seat 12 to close input port A. Simultaneously, exhaust port C is opened with a purge of the compressed air successively via output port B, air chamber D, and exhaust port C, as illustrated in FIG. 1.

When a current passing through coil 38 is interrupted, valve body 16 will not immediately be moved by movable iron core 32 but will remain for a while still pressed in tight contact with valve seat 14 of exhaust port C via the elastic exhaust-controlling valve 22 under the inside pressure of the air chamber D. After a while, since valve body 16 is designed to swing about pivot 18, exhaust-controlling valve 22 will begin to move away from from valve seat 14 with initial release of exhaust-controlling valve 22 at its end section. When one end of the exhaust-controlling valve 22 has slightly disengaged from valve seat 14, the air within air chamber D will begin to flow into exhaust-port C with rapid balancing of the pressures between air chamber D and exhaust port C, facilitating the futher swing of valve body 16.

As for the structure of the system, valve body 16, input-controlling valve 20, and exhaust-controlling valve 22 may be formed together in a unit of an elastic material such as rubber, and hole 24 is not necessarily required.

As for the shape of valve body 16, it is not restricted to any special shape but any shapes will do which may allow slight swing of themselves within air chamber D between input port A and exhaust port C.

As for the mechanism for the swing of valve body 16, it is not restricted to the use of pivot 18. An example of a applicable mechanism is such wherein a reversed-T-shaped groove is formed on the wall of air chamber D between input port A and exhaust port C and a projection matching in shape the groove is formed on valve body 16 so that setting the projection into the groove may enable valve body 16 to swing between valve seats 12 and 14.

As for the mechanism for controlling the swing of valve body 16, it is not restricted to the above-described electrical mechanism 30. An example of a different applicable mechanism is a rotary cam (not shown in the figures) capable of machanical control for the swing of valve body 16. Another example is such that pivot 18 is extended out of valve box 10 and a knob (not shown in the figures) is provided at the end of the extended pivot 18 so that swing of this knob may result in swing of valve body 16.

As for the center position for the swing of valve body 16, it is not restricted to the position indicated in the figures. Any positions will do which allow swing of valve body 16 to open and close alternately input port A and exhaust port C.

The mechanism of the present invention is not restricted to air valves but applicable to change-over of various fluids. According to the present invention, the valve body may easily be released from the valve seat by a slight force against back-pressure since the valve body is designed to swing within the fluid chamber, no trouble is encountered from contamination of sliding surfaces with foreign matter as is usual with conventional valves, products may be supplied at low cost since they are based on simple structures, and so on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A three-way change-over valve comprising:
   a valve box;
   a fluid chamber being disposed within said valve box, said fluid chamber including at least a first, second, third and fourth wall, said first and second walls being substantially perpendicular with respect to each other, said third wall of said fluid chamber is positioned at approximately ninety agrees from said first wall;
   an input port communication through said first wall of said fluid chamber;
   an exhaust port communicating through said second wall of said fluid chamber;
   an output portion communicating through said third wall of said fluid chamber;
   said fourth wall including an aperture disposed therein;
   a valve body operatively positioned within said fluid chamber for sequentially opening and closing said input port and said exhaust port;
   a pivot axis affixed to said valve body and being positioned adjacent to said first and second walls;
   an electromagnetic controlling mechanism for imparting movement to and for releasing said valve body for sequentially opening and closing said input port and said exhaust port, said electromagenetic controlling mechanism being affixed to said fourth wall;
   said electromagnetic controlling mechanism includes a movable core operatively positioned for selectively entering through said aperture in said fourth wall and into said fluid chamber towards said first wall and for retracting from said fluid chamber; and
   a biasing means operatively connected to said movable core for normally biasing said movable core into said fluid chamber, said biasing means is a spring;
   said electromagnetic controlling mechanism being adapted to be energized for retracting said movable core from said fluid chamber;
   said valve body being formed in the shape of approximately a cube and includes a hollow control portion in which an exhaust controlling valve is positioned;
   said exhaust controlling valve is said valve body is positioned to cooperate with said exhaust port in said second wall of said fluid chamber; and
   an input-controlling valve is fixed to said valve body and is positioned to cooperate with said input port communicating through said first wall of said fluid chamber;
   wherein when said electromagnetic controlling mechanism is deenergized, said biasing means biases said movable core directly against said valve body and against said input port for closing said input port against the flow of fluid from the input port, and when said electromagnetic controlling mechanism is energized, said movable core is retracted from said fluid chamber against said biasing means to release said valve body from said input port and for enabling said input pressure to move said valve body for closing said exhaust port.

* * * * *